(12) United States Patent
Fedeyko et al.

(10) Patent No.: US 9,561,469 B2
(45) Date of Patent: Feb. 7, 2017

(54) CATALYST FOR TREATING EXHAUST GAS (71) Applicant: Johnson Matthey Public Limited Company, London (GB)

(72) Inventors: Joseph Michael Fedeyko, Malvern, PA (US); Alexander Nicholas Michael Green, Baldock (GB); Guy Richard Chandler, Cambridge (GB); Jillian Elaine Collier, Reading (GB); Hai-Ying Chen, Conshohocken, PA (US)

(73) Assignee: Johnson Matthey Public Limited Company, London (GB)

(*) Notice: Subject to any disclaimer, the term of this patent is extended or adjusted under 35 U.S.C. 154(b) by 17 days.

(21) Appl. No.: 14/665,051

(22) Filed: Mar. 23, 2015

(65) Prior Publication Data

US 2015/0265969 A1 Sep. 24, 2015

Related U.S. Application Data

(60) Provisional application No. 61/969,350, filed on Mar. 24, 2014.

(51) Int. Cl.
| | | |
|---|---|---|
| *B01D 53/94* | (2006.01) | |
| *B01D 53/86* | (2006.01) | |
| *F01N 3/18* | (2006.01) | |
| *G06F 9/46* | (2006.01) | |
| *G06F 13/28* | (2006.01) | |
| *G06F 15/173* | (2006.01) | |
| *B01J 37/02* | (2006.01) | |
| *B01J 29/072* | (2006.01) | |
| *B01J 29/76* | (2006.01) | |
| *B01J 35/04* | (2006.01) | |
| *B01J 35/00* | (2006.01) | |

(52) U.S. Cl.
CPC ........ *B01D 53/9418* (2013.01); *B01J 29/072* (2013.01); *B01J 29/76* (2013.01); *B01J 29/763* (2013.01); *B01J 35/04* (2013.01); *B01J 37/0246* (2013.01); *G06F 9/467* (2013.01); *G06F 13/287* (2013.01); *G06F 15/17331* (2013.01); *B01D 53/9477* (2013.01); *B01D 2251/2062* (2013.01); *B01D 2255/20761* (2013.01); *B01D 2255/50* (2013.01); *B01J 35/0006* (2013.01); *B01J 2229/186* (2013.01); *Y02C 20/10* (2013.01)

(58) Field of Classification Search
CPC ............. B01D 53/565; B01D 53/8628; B01D 53/9413; B01D 53/9418; F01N 3/2066
See application file for complete search history.

(56) References Cited

U.S. PATENT DOCUMENTS 8,293,199 B2 * 10/2012 Beutel ................ B01D 53/9418
423/213.2
8,613,896 B2 * 12/2013 Angelides .......... B01D 53/8625
422/207

(Continued)

FOREIGN PATENT DOCUMENTS

EP 2517778 A1 10/2012

*Primary Examiner* — Timothy Vanoy
(74) *Attorney, Agent, or Firm* — Jimmie D. Johnson (57) ABSTRACT

Provided is a method for reducing $N_2O$ emissions in an exhaust gas comprising contacting an exhaust gas containing $NH_3$ and an inlet NO concentration with an SCR catalyst composition containing small pore zeolite having an SAR of about 3 to about 15 and having about 1-5 wt. % of an exchanged transition metal.

13 Claims, 1 Drawing Sheet (56) References Cited

U.S. PATENT DOCUMENTS

| | | | |
|---|---|---|---|
| 8,961,914 B2* | 2/2015 | Mohanan | B01J 29/763 423/213.2 |
| 2011/0044873 A1* | 2/2011 | Ahn | B01D 53/8628 423/239.2 |
| 2012/0014867 A1* | 1/2012 | Bull | B01J 29/68 423/700 |
| 2012/0201731 A1 | 8/2012 | Ballinger et al. | |
| 2013/0142727 A1 | 6/2013 | Li et al. | |
| 2013/0224082 A1 | 8/2013 | Narula et al. | |
| 2013/0280160 A1* | 10/2013 | Ariga | C01B 39/48 423/704 |
| 2014/0112852 A1* | 4/2014 | Mohanan | B01J 29/763 423/213.2 |
| 2015/0030507 A1* | 1/2015 | Nobukawa | B01D 53/9418 422/170 |

* cited by examiner

CATALYST FOR TREATING EXHAUST GAS

BACKGROUND

Field of Invention

The present invention relates to catalysts, articles, and methods for treating combustion exhaust gas.

Description of Related Art

Combustion of hydrocarbon-based fuel in engines produces exhaust gas that contains, in large part, relatively benign nitrogen ($N_2$), water vapor ($H_2O$), and carbon dioxide ($CO_2$). But the exhaust gases also contain, in relatively small part, noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of flue and exhaust gas released into the atmosphere, it is desirable to eliminate or reduce the amount of the undesirable components, preferably by a process that, in turn, does not generate other noxious or toxic substances.

Typically, exhaust gases from lean burn gas engines have a net oxidizing effect due to the high proportion of oxygen that is provided to ensure adequate combustion of the hydrocarbon fuel. In such gases, one of the most burdensome components to remove is $NO_x$, which includes nitric oxide (NO), nitrogen dioxide ($NO_2$), and nitrous oxide ($N_2O$). The reduction of $NO_x$ to $N_2$ is particularly problematic because the exhaust gas contains enough oxygen to favor oxidative reactions instead of reduction. Notwithstanding, NO can be reduced by a process commonly known as Selective Catalytic Reduction (SCR). An SCR process involves the conversion of $NO_x$, in the presence of a catalyst and with the aid of a reducing agent, such as ammonia, into elemental nitrogen ($N_2$) and water. In an SCR process, a gaseous reductant such as ammonia is added to an exhaust gas stream prior to contacting the exhaust gas with the SCR catalyst. The reductant is absorbed onto the catalyst and the NO reduction reaction takes place as the gases pass through or over the catalyzed substrate. The chemical equation for stoichiometric SCR reactions using ammonia is:

$$4NO + 4NH_3 + O_2 \rightarrow 4N_2 + 6H_2O$$

$$2NO_2 + 4NH_3 + O_2 \rightarrow 3N_2 + 6H_2O$$

$$NO + NO_2 + 2NH_3 \rightarrow 2N_2 + 3H_2O$$

Zeolites having an exchanged transition metal are known to be useful as SCR catalysts. Conventional small pore zeolites exchanged with copper are particularly useful in achieving high $NO_x$ conversion at low temperatures. However, the interaction of $NH_3$ with NO absorbed onto the transition metal of an exchanged zeolite can lead to an undesirable side reaction that produces $N_2O$. This $N_2O$ is particularly problematic to remove from the exhaust stream. Accordingly, there remains a need for improved methods that result in a high conversion of $NO_x$. The present invention satisfies this need amongst others.

SUMMARY OF THE INVENTION

Surprisingly, it has been found that metal-exchanged zeolites having a small pore structure and a silica-to-alumina ratio (SAR) of about 3 to about 15 result in a decrease production of $N_2O$ compared to similar metal-exchanged zeolites having a higher SAR value. Accordingly, the present invention provides improved catalytic performance in applications such as selective catalytic reduction (SCR) of $NO_x$.

Accordingly, in one aspect of the invention, provided is a method for reducing $N_2O$ emissions in an exhaust gas comprising contacting an exhaust gas containing $NH_3$ and an inlet NO concentration with an SCR catalyst composition containing small pore zeolite having an SAR of about 3 to about 15 and having 1-5 wt. % of an exchanged transition metal to produce a purified gas containing an outlet NO concentration and an outlet $N_2O$ concentration, wherein (a) the inlet NO concentration and outlet NO concentration have a relative ratio of >about 4, and (b) the inlet NO concentration and outlet $N_2O$ concentration have a relative ratio of >about 50. As used herein, the terms "inlet" and "outlet" exhaust gas (or relative component concentrations) mean the exhaust gas (or relative component concentrations) immediately upstream and downstream, respectively, of the SCR and/or ASC filter. The term "immediately upstream" and "immediately downstream" mean that the exhaust gas prior to and subsequent to, respectively, the SCR and/or ASC catalyst without any intervening catalyst operations that would decrease the $N_2O$ concentration of the purified exhaust gas.

According to another aspect of the invention, provided is a system for treating an exhaust gas comprising, in series and in fluid communication, a diesel oxidation catalyst, a source of nitrogen-based reductant, and an SCR catalyst, wherein the SCR catalyst comprises a small pore zeolite having an SAR of about 3 to about 15 and having about 1-5 wt. % of an exchanged transition metal, and wherein the SCR catalyst is coated on a honeycomb wall-flow filter or flow-through monolith or is an extruded honeycomb body.

DETAILED DESCRIPTION OF PREFERRED EMBODIMENTS OF THE INVENTION

In a certain aspect, the invention is directed to a method for improving environmental air quality, particularly for improving exhaust gas emissions generated by power plants, gas turbines, lean burn internal combustion engines, and the like. Exhaust gas emissions are improved, at least in part, by reducing $NO_x$ and $N_2O$ concentrations over a broad operational temperature range.

The method for reducing $N_2O$ emissions in an exhaust gas can comprise the steps of contacting an exhaust gas containing $NH_3$ and an inlet NO concentration with an SCR catalyst composition containing small pore zeolite having an SAR of about 3 to about 15 and having about 1-5 wt. % of an exchanged transition metal to produce a purified gas containing a low outlet NO concentration and a low outlet $N_2O$ concentration, wherein (a) the inlet NO concentration and outlet NO concentration have a relative ratio of greater than about 4, and (b) the inlet NO concentration and outlet $N_2O$ concentration have a relative ratio of greater than about 50. According to the invention, the contacting occurs at a temperature of less than about 350° C., for example about 150-350° C. or about 200-300° C.; or at a temperature less than about 700° C. and/or at a temperature greater than about 350° C. or greater than about 450° C., for example about 350-700° C., about 350-600° C., or about 450-550° C.

In certain embodiments, the exhaust gas has a relative high $NO_2$:NO ratio, for example, at least about 4:1, at least about 10:1, or at least about 20:1. In certain embodiments, the inlet $NO_2$ concentration and outlet $NO_2$ concentration of the exhaust gas have a relative ratio of greater than about 4, for example at least about 5, at least about 10, or at least about 20, and (b) the inlet $NO_2$ concentration and outlet $N_2O$ concentration have a relative ratio of greater than about 50, for example at least about 100 or at least about 200.

Zeolites of the present invention are crystalline or quasi-crystalline aluminosilicates which are constructed of repeating $SiO_4$ and $AlO_4$ tetrahedral units linked together, for example in rings, to form frameworks having regular intra-crystalline cavities and channels of molecular dimensions. The specific arrangement of tetrahedral units gives rise to the zeolite framework, and by convention, each unique framework is assigned a unique three-letter code (e.g., "AEI") by the International Zeolite Association (IZA).

Particularly useful zeolites to the present invention are small pore zeolites. As used herein, the term "small pore zeolite" means a zeolite framework having a maximum ring size of eight tetrahedral atoms. In some examples, the small pore zeolite for use in the present invention have a pore size in at least one dimension of less than 4.3 Å. In one embodiment, the small pore zeolite has a framework selected from the group of consisting of: ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON. Preferred zeolite frameworks are selected from AEI, AFT, AFX, CHA, DDR, ERI, LEV, KFI, RHO, and UEI. For certain applications, preferred zeolite frameworks are selected from AEI, AFT, and AFX, particularly AEI. In certain application, a preferred zeolite framework is CHA. In certain applications, an ERI framework is preferred. In certain embodiments, the zeolite is essentially free of CHA frameworks. In certain embodiments, the zeolite is essentially free of AEI frameworks. In certain embodiments, the zeolite is essentially free of ERI frameworks. Particular zeolites that are useful for the present invention include SSZ-39, Mu-10, SSZ-16, SSZ-13, Sigma-1, ZSM-34, NU-3, ZK-5, and MU-18.

Preferably, the primary crystalline phase of the zeolite is constructed of one or more small pore frameworks, although other aluminosilicate crystalline phases may also be present. Preferably, the primary crystalline phase comprises at least about 90 weight percent, more preferably at least about 95 weight percent, and even more preferably at least about 98 or at least about 99 weight percent small pore zeolite framework, based on the total amount of zeolite in the material.

Preferably, a majority of the zeolite structure is constructed of alumina and silica. The zeolite may include framework metals other than aluminum (i.e., metal-substituted zeolites). As used herein, the term "metal substituted" with respect to a zeolite means a zeolite framework in which one or more aluminum or silicon framework atoms has been replaced by the substituting metal. In contrast, the term "metal exchanged" means a zeolite in which one or more ionic species associated with the zeolite (e.g., $H^+$, $NH4^+$, $Na^+$, etc.) has been replaced by a metal (e.g., a metal ion or free metal, such as metal oxide), wherein the metal is not incorporated as a zeolite framework atom (e.g., T-atom), but instead is incorporated into the molecular pores or on the external surface of the zeolite framework.

Preferably, the zeolite is free or essentially free of phosphorous. Thus, the term "zeolite" as used herein, does not encompass silicoaluminophosphate molecular sieves (SAPOs) or aluminophosphates (AlPOs).

Preferred zeolites have a silica-to-alumina ratio of about 3 to about 15, such as about 3 to about 5, about 5 to about 10, about 10 to about 15, about 3 to about 9, about 5 to about 7, or about 9 to about 14. A minimum SAR is required to achieve an adequate thermostability. Surprisingly, a maximum SAR value is necessary to prevent or limit the formation of $N_2O$.

The silica-to-alumina ratio of zeolites may be determined by conventional analysis. This ratio is meant to represent, as closely as possible, the ratio in the rigid atomic framework of the zeolite crystal and to exclude silicon or aluminum in the binder or in cationic or other form within the channels. Since it may be difficult to directly measure the silica to alumina ratio of zeolite after it has been combined with a binder material, particularly an alumina binder, these silica-to-alumina ratios are expressed in terms of the SAR of the zeolite per se, i.e., prior to the combination of the zeolite with the other catalyst components.

The catalyst composition comprises at least one transition metal disposed on and/or within the zeolite material as extra-framework metals (also referred to herein as a metal-promoted zeolite). As used herein, an "extra-framework metal" is one that resides within the molecular sieve and/or on at least a portion of the molecular sieve surface, preferably as an ionic species, does not include aluminum, and does not include atoms constituting the framework of the molecular sieve. Preferably, the presence of the transition metal facilitates the treatment of exhaust gases, such as exhaust gas from a diesel engine, including processes such as $NO_x$ reduction, $NH_3$ oxidation, and $NO_x$ storage, while also suppressing the formation of $N_2O$.

The transition metal may be any of the recognized catalytically active metals that are used in the catalyst industry to form metal-exchanged zeolites, particularly those metals that are known to be catalytically active for treating exhaust gases derived from a combustion process. Particularly preferred are metals useful in $NO_x$ reduction and storage processes. Transition metal should be broadly interpreted and specifically includes copper, nickel, zinc, iron, tungsten, molybdenum, cobalt, titanium, zirconium, manganese, chromium, vanadium, niobium, as well as tin, bismuth, and antimony; platinum group metals, such as ruthenium, rhodium, palladium, indium, platinum, and precious metals such as gold and silver. Preferred transition metals are base metals, and preferred base metals include those selected from the group consisting of chromium, manganese, iron, cobalt, nickel, and copper, and mixtures thereof. In a preferred embodiment, at least one of the transition metals is copper. Other preferred transition metals include iron, particularly in combination with copper.

In certain embodiments, the transition metal is present in the zeolite material at a concentration of about 0.1 to about 10 weight percent (wt %) based on the total weight of the zeolite, for example from about 0.5 wt % to about 5 wt %, from about 0.5 to about 1 wt %, from about 1 to about 5 wt %, about 2.5 wt % to about 3.5 wt %, and about 3 wt % to about 3.5 wt %. For embodiments which utilize copper, the concentration of these transition metals in the zeolite material is preferably about 0.5 to about 5 weight percent, more preferably about 2.5 to about 3.5 weight percent.

In certain embodiments, the transition metal, such as copper, is present in an amount from about 80 to about 120 g/ft$^3$ of zeolite or washcoat loading, including for example about 85 to about 95 g/ft$^3$, or about 90 to about 95 g/ft$^3$.

In certain embodiments, the transition metal is present in an amount relative to the amount of aluminum in the zeolite, namely the framework aluminum. As used herein, the transition metal:aluminum (M:Al) ratio is based on the relative molar amount of transition metal to molar framework Al in the corresponding zeolite. In certain embodiments, the catalyst material has a M:Al ratio of about 0.1 to about 1.0, preferably about 0.2 to about 0.5. An M:Al ratio of about 0.2 to about 0.5 is particularly useful where M is copper, and more particularly where M is copper and the SAR of the zeolite is about 10-15.

Preferably, the metal is highly dispersed within the zeolite crystals, preferably without a high temperature treatment of the metal loaded zeolite. For embodiments which utilize copper, the copper loading is preferably fully ion exchanges and/or is preferably less than can be accommodated by the exchange sites of the zeolite support. Preferably, the catalyst is free of substantially free of bulk copper oxide, free or substantially free of species of copper on external zeolite crystal surfaces, and/or free or substantially free of copper metal clusters as measured by temperature programmed reduction (TPR) analysis and/or UV-vis analysis.

In one example, a metal-exchanged zeolite is created by blending the zeolite, for example a H-form zeolite or an NH$_4$-form zeolite, into a solution containing soluble precursors of the catalytically active metal(s). The pH of the solution may be adjusted to induce precipitation of the catalytically active metal cations onto or within the zeolite structure (but not including the zeolite framework). For example, in a preferred embodiment, a zeolite material is immersed in a solution containing copper nitrate or copper acetate for a time sufficient to allow incorporation of the catalytically active copper cations into the molecular sieve structure by ion exchange. Un-exchanged copper ions are precipitated out. Depending on the application, a portion of the un-exchanged ions can remain in the molecular sieve material as free copper. The metal-exchanged zeolite may then be washed, dried, and calcined. The calcined material may include a certain percentage of copper as copper oxide residing on the surface of the zeolite or within the zeolite cavities.

Generally, ion exchange of the catalytic metal cation into or on the zeolite may be carried out at room temperature or at a temperature up to about 80° C. over a period of about 1 to 24 hours at a pH of about 7. The resulting catalytic molecular sieve material is preferably dried at about 100 to 120° C. overnight and calcined at a temperature of at least about 500° C.

In certain embodiments, the catalyst composition comprises the combination of at least one transition metal and at least one alkali or alkaline earth metal, wherein the transition metal(s) and alkali or alkaline earth metal(s) are disposed on or within the zeolite material. The alkali or alkaline earth metal can be selected from sodium, potassium, rubidium, cesium, magnesium, calcium, strontium, barium, or some combination thereof. As used here, the phrase "alkali or alkaline earth metal" does not mean the alkali metals and alkaline earth metals are used in the alternative, but instead that one or more alkali metals can be used alone or in combination with one or more alkaline earth metals and that one or more alkaline earth metals can be used alone or in combination with one or more alkali metals.

In certain embodiments, alkali metals are preferred. In certain embodiments, alkaline earth metals are preferred. Preferred alkali or alkaline earth metals include calcium, potassium, and combinations thereof. In certain embodiments, the catalyst composition is essentially free of magnesium and/or barium. In certain embodiments, the catalyst is essentially free of any alkali or alkaline earth metal except calcium and potassium. In certain embodiments, the catalyst is essentially free of any alkali or alkaline earth metal except calcium. And in certain other embodiments, the catalyst is essentially free of any alkali or alkaline earth metal except potassium. As used herein, the term "essentially free" means that the material does not have an appreciable amount of the particular metal. That is, the particular metal is not present in amount that would affect the basic physical and/or chemical properties of the material, particularly with respect to the material's capacity to selectively reduce or store NO$_x$.

In certain embodiments, the zeolite material has an alkali content of less than 3 weight percent, more preferably less than 1 weight percent, and even more preferably less than 0.1 weight percent.

In certain embodiments, the alkali and/or alkaline earth metal (collectively $A_M$) is present in the zeolite material in an amount relative to the amount of transition metal (M) in the zeolite. Preferably, the M and $A_M$ are present, respectively, in a molar ratio of about 15:1 to about 1:1, for example about 10:1 to about 2:1, about 10:1 to about 3:1, or about 6:1 to about 4:1, particularly were M is copper and $A_M$ is calcium. In certain embodiments which include an alkali and/or alkaline earth metal such as calcium, the amount of copper present is less than 2.5 weight percent, for example less than 2 weight percent or less than 1 weight percent, based on the weight of the zeolite.

In certain embodiments, the relative cumulative amount of transition metal (M) and alkali and/or alkaline earth metal ($A_M$) is present in the zeolite material in an amount relative to the amount of aluminum in the zeolite, namely the framework aluminum. As used herein, the (M+$A_M$):Al ratio is based on the relative molar amounts of M+$A_M$ to molar framework Al in the corresponding zeolite. In certain embodiments, the catalyst material has a (M+$A_M$):Al ratio of not more than about 0.6. In certain embodiments, the (M+$A_M$):Al ratio is not more than 0.5, for example about 0.05 to about 0.5, about 0.1 to about 0.4, or about 0.1 to about 0.2.

The transition metal and alkali/alkaline earth metal can be added to the molecular sieve via any known technique such as ion exchange, impregnation, isomorphous substitution, etc. The transition metal and the alkali or alkaline earth metal can be added to the zeolite material in any order (e.g., the metal can be exchanged before, after, or concurrently with the alkali or alkaline earth metal), but preferably the alkali or alkaline earth metal is added prior to or concurrently with the transition metal, particularly when the alkali earth metal is calcium and the transition metal is copper.

In certain embodiments, the metal promoted zeolite catalysts of the present invention also contain a relatively large amount of cerium (Ce). In certain embodiments, the cerium concentration in the catalyst material is present in a concentration of at least about 1 weight percent, based on the total weight of the zeolite. Examples of preferred concentrations include at least about 2.5 weight percent, at least about 5 weight percent, at least about 8 weight percent, at least about 10 weight percent, about 1.35 to about 13.5 weight percent, about 2.7 to about 13.5 weight percent, about 2.7 to about 8.1 weight percent, about 2 to about 4 weight percent, about 2 to about 9.5 weight percent, and about 5 to about 9.5 weight percent, based on the total weight of the zeolite. In certain embodiments, the cerium concentration in the catalyst material is about 50 to about 550 g/ft$^3$. Other ranges of Ce include: above 100 g/ft$^3$, above 200 g/ft$^3$, above 300 g/ft$^3$, above 400 g/ft$^3$, above 500 g/ft$^3$, from about 75 to about 350 g/ft$^3$, from about 100 to about 300 g/ft$^3$, and from about 100 to about 250 g/ft$^3$.

In certain embodiments, the concentration of Ce exceeds the theoretical maximum amount available for exchange on the metal-promoted zeolite. Accordingly, in some embodiments, Ce is present in more than one form, such as Ce ions, monomeric ceria, oligomeric ceria, and combinations thereof, provided that said oligomeric ceria has a mean crystal size of less than 5 μm, for example less than 1 μm, about 10 nm to about 1 μm, about 100 nm to about 1 μm, about 500 nm to about 1 μm, about 10 to about 500 nm, about 100 to about 500 nm, and about 10 to about 100 nm. As used herein, the term "monomeric ceria" means $CeO_2$ as individual molecules or moieties residing freely on and/or in the zeolite or weakly bonded to the zeolite. As used herein, the term "oligomeric ceria" means nanocrystalline $CeO_2$ residing freely on and/or in the zeolite or weakly bonded to the zeolite.

Catalysts of the present invention are applicable for heterogeneous catalytic reaction systems (i.e., solid catalyst in contact with a gas reactant). To improve contact surface area, mechanical stability, and/or fluid flow characteristics, the catalysts can be disposed on and/or within a substrate, preferably a porous substrate. In certain embodiments, a washcoat containing the catalyst is applied to an inert substrate, such as corrugated metal plate or a honeycomb cordierite brick. Alternatively, the catalyst is kneaded along with other components such as fillers, binders, and reinforcing agents, into an extrudable paste which is then extruded through a die to form a honeycomb brick. Accordingly, in certain embodiments provided is a catalyst article comprising a metal-promoted zeolite catalyst described herein coated on and/or incorporated into a substrate.

Certain aspects of the invention provide a catalytic washcoat. The washcoat comprising the metal promoted zeolite catalyst described herein is preferably a solution, suspension, or slurry. Suitable coatings include surface coatings, coatings that penetrate a portion of the substrate, coatings that permeate the substrate, or some combination thereof.

A washcoat can also include non-catalytic components, such as fillers, binders, stabilizers, rheology modifiers, and other additives, including one or more of alumina, silica, non-zeolite silica alumina, titania, zirconia, ceria. In certain embodiments, the catalyst composition may comprise pore-forming agents such as graphite, cellulose, starch, polyacrylate, and polyethylene, and the like. These additional components do not necessarily catalyze the desired reaction, but instead improve the catalytic material's effectiveness, for example, by increasing its operating temperature range, increasing contact surface area of the catalyst, increasing adherence of the catalyst to a substrate, etc. In preferred embodiments, the washcoat loading is >0.3 g/in$^3$, such as >1.2 g/in$^3$, >1.5 g/in$^3$, >1.7 g/in$^3$ or >2.00 g/in$^3$, and preferably <3.5 g/in$^3$, such as <2.5 g/in$^3$. In certain embodiments, the washcoat is applied to a substrate in a loading of about 0.8 to 1.0 g/in$^3$, 1.0 to 1.5 g/in$^3$, or 1.5 to 2.5 g/in$^3$.

Two of the most common substrate designs are plate and honeycomb. Preferred substrates, particularly for mobile applications, include flow-through monoliths having a so-called honeycomb geometry that comprise multiple adjacent, parallel channels that are open on both ends and generally extend from the inlet face to the outlet face of the substrate and result in a high-surface area-to-volume ratio. For certain applications, the honeycomb flow-through monolith preferably has a high cell density, for example about 600 to 800 cells per square inch, and/or an average internal wall thickness of about 0.18-0.35 mm, preferably about 0.20-0.25 mm. For certain other applications, the honeycomb flow-through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite, e.g., acicular mullite, pollucite, a thermet such as $Al_2OsZFe$, $Al_2O_3$/Ni or $B_4CZFe$, or composites comprising segments of any two or more thereof. Preferred materials include cordierite, silicon carbide, and alumina titanate.

Plate-type catalysts have lower pressure drops and are less susceptible to plugging and fouling than the honeycomb types, which is advantageous in high efficiency stationary applications, but plate configurations can be much larger and more expensive. A Honeycomb configuration is typically smaller than a plate type, which is an advantage in mobile applications, but has higher pressure drops and plug more easily. In certain embodiments the plate substrate is constructed of metal, preferably corrugated metal.

In certain embodiments, the invention is a catalyst article made by a process described herein. In a particular embodiment, the catalyst article is produced by a process that includes the steps of applying a metal-promoted zeolite composition, preferably as a washcoat, to a substrate as a layer either before or after at least one additional layer of another composition for treating exhaust gas has been applied to the substrate. The one or more catalyst layers on the substrate, including the metal-promoted zeolite catalyst layer, are arranged in consecutive layers. As used herein, the term "consecutive" with respect to catalyst layers on a substrate means that each layer is contact with its adjacent layer(s) and that the catalyst layers as a whole are arranged one on top of another on the substrate.

In certain embodiments, the metal-promoted zeolite catalyst is disposed on the substrate as a first layer and another composition, such as an oxidation catalyst, reduction catalyst, scavenging component, or $NO_x$ storage component, is disposed on the substrate as a second layer. In other embodiments, the metal-promoted zeolite catalyst is disposed on the substrate as a second layer and another composition, such as such as an oxidation catalyst, reduction catalyst, scavenging component, or $NO_x$ storage component, is disposed on the substrate as a first layer. As used herein the terms "first layer" and "second layer" are used to describe the relative positions of catalyst layers in the catalyst article with respect to the normal direction of exhaust gas flow-through, past, and/or over the catalyst article. Under normal exhaust gas flow conditions, exhaust gas contacts the first layer prior to contacting the second layer. In certain embodiments, the second layer is applied to an inert substrate as a bottom layer and the first layer is top layer that is applied over the second layer as a consecutive series of sub-layers. In such embodiments, the exhaust gas penetrates (and hence contacts) the first layer, before contacting the second layer, and subsequently returns through the first layer to exit the catalyst component. In other embodiments, the first layer is a first zone disposed on an upstream portion of the substrate and the second layer is disposed on the substrate as a second zone, wherein the second zone is downstream of the first.

In another embodiment, the catalyst article is produced by a process that includes the steps of applying a metal-promoted zeolite catalyst composition, preferably as a washcoat, to a substrate as a first zone, and subsequently applying at least one additional composition for treating an exhaust gas to the substrate as a second zone, wherein at least a portion of the first zone is downstream of the second zone. Alternatively, the metal-promoted zeolite catalyst composition can be applied to the substrate in a second zone that is downstream of a first zone containing the additional composition. Examples of additional compositions include oxidation catalysts, reduction catalysts, scavenging components (e.g., for sulfur, water, etc.), or $NO_x$ storage components.

To reduce the amount of space required for an exhaust system, individual exhaust components in certain embodiments are designed to perform more than one function. For example, applying an SCR catalyst to a wall-flow filter substrate instead of a flow-through substrate serves to reduce the overall size of an exhaust treatment system by allowing one substrate to serve two functions, namely catalytically reducing $NO_x$ concentration in the exhaust gas and mechanically removing soot from the exhaust gas. Accordingly, in certain embodiments, the substrate is a honeycomb wall-flow filter or partial filter. Wall-flow filters are similar to flow-through honeycomb substrates in that they contain a plurality of adjacent, parallel channels. However, the channels of flow-through honeycomb substrates are open at both ends, whereas the channels of wall-flow substrates have one end capped, wherein the capping occurs on opposite ends of adjacent channels in an alternating pattern. Capping alternating ends of channels prevents the gas entering the inlet face of the substrate from flowing straight through the channel and existing. Instead, the exhaust gas enters the front of the substrate and travels into about half of the channels where it is forced through the channel walls prior to entering the second half of the channels and exiting the back face of the substrate.

The substrate wall has a porosity and pore size that is gas permeable, but traps a major portion of the particulate matter, such as soot, from the gas as the gas passes through the wall. Preferred wall-flow substrates are high efficiency filters. Wall flow filters for use with the present invention preferably have an efficiency of least 70%, at least about 75%, at least about 80%, or at least about 90%. In certain embodiments, the efficiency will be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

Porosity is a measure of the percentage of void space in a porous substrate and is related to backpressure in an exhaust system: generally, the lower the porosity, the higher the backpressure. Preferably, the porous substrate has a porosity of about 30 to about 80%, for example about 40 to about 75%, about 40 to about 65%, or from about 50 to about 60%.

The pore interconnectivity, measured as a percentage of the substrate's total void volume, is the degree to which pores, void, and/or channels, are joined to form continuous paths through a porous substrate, i.e., from the inlet face to the outlet face. In contrast to pore interconnectivity is the sum of closed pore volume and the volume of pores that have a conduit to only one of the surfaces of the substrate.

Preferably, the porous substrate has a pore interconnectivity volume of at least about 30%, more preferably at least about 40%.

The mean pore size of the porous substrate is also important for filtration. Mean pore size can be determined by any acceptable means, including by mercury porosimetry. The mean pore size of the porous substrate should be of a high enough value to promote low backpressure, while providing an adequate efficiency by either the substrate per se, by promotion of a soot cake layer on the surface of the substrate, or combination of both. Preferred porous substrates have a mean pore size of about 10 to about 40 μm, for example about 20 to about 30 μm, about 10 to about 25 μm, about 10 to about 20 μm, about 20 to about 25 μm, about 10 to about 15 μm, and about 15 to about 20 μm.

In general, the production of an extruded solid body containing the metal promoted zeolite catalyst involves blending the zeolite and the transition metal (either separately or together as a metal-exchanged zeolite), a binder, an optional organic viscosity-enhancing compound into an homogeneous paste which is then added to a binder/matrix component or a precursor thereof and optionally one or more of stabilized ceria, and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body. A metal-promoted zeolite catalyst may also be washcoated or otherwise applied to the extruded solid body as one or more sub-layers that reside on the surface or penetrate wholly or partly into the extruded solid body. Alternatively, a metal-promoted zeolite can be added to the paste prior to extrusion.

Extruded solid bodies containing metal-promoted zeolites according to the present invention generally comprise a unitary structure in the form of a honeycomb having uniform-sized and parallel channels extending from a first end to a second end thereof. Channel walls defining the channels are porous. Typically, an external "skin" surrounds a plurality of the channels of the extruded solid body. The extruded solid body can be formed from any desired cross section, such as circular, square or oval. Individual channels in the plurality of channels can be square, triangular, hexagonal, circular etc. Channels at a first, upstream end can be blocked, e.g. with a suitable ceramic cement, and channels not blocked at the first, upstream end can also be blocked at a second, downstream end to form a wall-flow filter. Typically, the arrangement of the blocked channels at the first, upstream end resembles a checker-board with a similar arrangement of blocked and open downstream channel ends.

The binder/matrix component is preferably selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. The paste can optionally contain reinforcing inorganic fibers selected from the group consisting of carbon fibers, glass fibers, metal fibers, boron fibers, alumina fibers, silica fibers, silica-alumina fibers, silicon carbide fibers, potassium titanate fibers, aluminum borate fibers and ceramic fibers.

The alumina binder/matrix component is preferably gamma alumina, but can be any other transition alumina, i.e., alpha alumina, beta alumina, chi alumina, eta alumina, rho alumina, kappa alumina, theta alumina, delta alumina, lanthanum beta alumina and mixtures of any two or more such transition aluminas. It is preferred that the alumina is doped with at least one non-aluminum element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Sources of silica can include a silica sol, quartz, fused or amorphous silica, sodium silicate, an amorphous aluminosilicate, an alkoxysilane, a silicone resin binder such as methylphenyl silicone resin, a clay, talc or a mixture of any two or more thereof. Of this list, the silica can be $SiO_2$ as such, feldspar, mullite, silica-alumina, silica-magnesia, silica-zirconia, silica-thoria, silica-berylia, silica-titania, ternary silica-alumina-zirconia, ternary silica-alumina-magnesia, ternary-silica-magnesia-zirconia, ternary silica-alumina-thoria and mixtures of any two or more thereof.

Preferably, the metal-promoted zeolite is dispersed throughout, and preferably evenly throughout, the entire extruded catalyst body.

Where any of the above extruded solid bodies are made into a wall-flow filter, the porosity of the wall-flow filter can be from 30-80%, such as from 40-70%. Porosity and pore volume and pore radius can be measured e.g. using mercury intrusion porosimetry.

The metal-promoted zeolite catalyst described herein can promote the reaction of a reductant, preferably ammonia, with nitrogen oxides to selectively form elemental nitrogen ($N_2$) and water ($H_2O$). Thus, in one embodiment, the catalyst can be formulated to favor the reduction of nitrogen oxides with a reductant (i.e., an SCR catalyst). Examples of such reductants include hydrocarbons (e.g., C3-C6 hydrocarbons) and nitrogenous reductants such as ammonia and ammonia hydrazine or any suitable ammonia precursor, such as urea (($NH_2)_2CO$), ammonium carbonate, ammonium carbamate, ammonium hydrogen carbonate or ammonium formate. For example, the SCR process of the present method can result in a $NO_x$ conversion of at least 75%, preferably at least 80%, and more preferably at least 90%. The NO conversion can be represented as the relative ratio of NO concentration at the SCR inlet (unpurified exhaust gas) compared to the NO concentration at the SCR outlet and/or ASC outlet (purified exhaust gas). Preferably, the inlet NO concentration and outlet NO concentration have a ratio of greater than about 4, greater than about 5, or greater than about 10 over a broad temperature range (e.g., about 150-700° C., about 200-350° C., about 350-550° C., or about 450-550° C.). Likewise, the $NO_2$ conversion can be represented as the relative ratio of $NO_2$ concentration at the SCR inlet (unpurified exhaust gas) compared to the $NO_2$ concentration at the SCR outlet and/or ASC outlet (purified exhaust gas). Preferably, the inlet $NO_2$ concentration and outlet $NO_2$ concentration have a ratio of greater than about 4, greater than about 5, or greater than about 10 over a broad temperature range (e.g., about 150-700° C., about 200-350° C., about 350-550° C., or about 450-550° C.).

Importantly, the use of low SAR, small pore zeolites according to the present invention generates very low amounts of $N_2O$ compared to conventional zeolite catalysts. That is, the SCR process of the present method can result in low $N_2O$ generation based on NO and/or $NO_2$ at the SCR inlet. For example, the relative ratio of inlet NO concentration at the SCR catalyst compared to outlet $N_2O$ concentration after the SCR and/or ASC catalyst is greater than about 50, greater than about 80, or greater than about 100 over a broad temperature range (e.g., about 150-700° C., about 200-350° C., about 350-550° C., or about 450-550° C.). In another example, the relative ratio of inlet $NO_2$ concentration at the SCR catalyst compared to outlet $N_2O$ concentration after the SCR and/or ASC catalyst is greater than about 50, greater than about 80, or greater than about 100 over a broad temperature range (e.g., about 150-700° C., about 200-350° C., about 350-550° C., or about 450-550° C.).

The metal-promoted zeolite catalyst described herein can also promote the oxidation of ammonia. Thus, in another embodiment, the catalyst can be formulated to favor the oxidation of ammonia with oxygen, particularly a concentrations of ammonia typically encountered downstream of an SCR catalyst (e.g., ammonia oxidation (AMOX) catalyst, such as an ammonia slip catalyst (ASC)). In certain embodiments, the metal-promoted zeolite catalyst is disposed as a top layer over an oxidative under-layer, wherein the under-layer comprises a platinum group metal (PGM) catalyst or a non-PGM catalyst. Preferably, the catalyst component in the underlayer is disposed on a high surface area support, including but not limited to alumina.

In yet another embodiment, an SCR and AMOX operations are performed in series, wherein both processes utilize a catalyst comprising the metal-promoted zeolite described herein, and wherein the SCR process occurs upstream of the AMOX process. For example, an SCR formulation of the catalyst can be disposed on the inlet side of a filter and an AMOX formulation of the catalyst can be disposed on the outlet side of the filter.

Accordingly, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds and/or $NH_3$ in the gas. In certain embodiments, provided is a catalyst article having an ammonia slip catalyst disposed downstream of a selective catalytic reduction (SCR) catalyst. In such embodiments, the ammonia slip catalyst oxidizes at least a portion of any nitrogenous reductant that is not consumed by the selective catalytic reduction process. For example, in certain embodiments, the ammonia slip catalyst is disposed on the outlet side of a wall flow filter and an SCR catalyst is disposed on the upstream side of a filter. In certain other embodiments, the ammonia slip catalyst is disposed on the downstream end of a flow-through substrate and an SCR catalyst is disposed on the upstream end of the flow-through substrate. In other embodiments, the ammonia slip catalyst and SCR catalyst are disposed on separate bricks within the exhaust system. These separate bricks can be adjacent to, and in contact with, each other or separated by a specific distance, provided that they are in fluid communication with each other and provided that the SCR catalyst brick is disposed upstream of the ammonia slip catalyst brick.

In certain embodiments, the SCR and/or AMOX process is performed at a temperature of at least 100° C. In another embodiment, the process(es) occur at a temperature from about 150° C. to about 750° C. In a particular embodiment, the temperature range is from about 175 to about 550° C. In another embodiment, the temperature range is from 175 to 400° C. In yet another embodiment, the temperature range is 450 to 900° C., preferably 500 to 750° C., 500 to 650° C., 450 to 550° C., or 650 to 850° C. Embodiments utilizing temperatures greater than 450° C. are particularly useful for treating exhaust gases from a heavy and light duty diesel engine that is equipped with an exhaust system comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

According to another aspect of the invention, provided is a method for the reduction of $NO_x$ compounds and/or oxidation of $NH_3$ in a gas, which comprises contacting the gas with a catalyst described herein for a time sufficient to reduce the level of $NO_x$ compounds in the gas. Methods of the present invention may comprise one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the NOx concentration in the exhaust gas; and (f) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

In another embodiment, all or at least a portion of the nitrogen-based reductant, particularly $NH_3$, for consumption in the SCR process can be supplied by a $NO_x$ adsorber catalyst (NAC), a lean $NO_x$ trap (LNT), or a $NO_x$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 $g/ft^3$, such as 20 to 60 $g/ft^3$. Alternatively, the precious metal of the catalyst is characterized by the average concentration which may be from about 40 to about 100 $grams/ft^3$.

Under certain conditions, during the periodically rich regeneration events, $NH_3$ may be generated over a $NO_x$ adsorber catalyst. The SCR catalyst downstream of the $NO_x$ adsorber catalyst may improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

The method for treating exhaust gas as described herein can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

In certain aspects, the invention is a system for treating exhaust gas generated by combustion process, such as from an internal combustion engine (whether mobile or stationary), a gas turbine, coal or oil fired power plants, and the like. Such systems include a catalytic article comprising the metal-promoted zeolite described herein and at least one additional component for treating the exhaust gas, wherein the catalytic article and at least one additional component are designed to function as a coherent unit.

In certain embodiments, the system comprises a catalytic article comprising a metal-promoted zeolite described herein, a conduit for directing a flowing exhaust gas, a source of nitrogenous reductant disposed upstream of the catalytic article. The system can include a controller for the metering the nitrogenous reductant into the flowing exhaust gas only when it is determined that the zeolite catalyst is capable of catalyzing $NO_x$ reduction at or above a desired efficiency, such as at above 100° C., above 150° C. or above 175° C. The metering of the nitrogenous reductant can be arranged such that 60% to 200% of theoretical ammonia is present in exhaust gas entering the SCR catalyst calculated at 1:1 $NH_3/NO$ and 4:3 $NH_3/NO_2$.

In another embodiment, the system comprises an oxidation catalyst (e.g., a diesel oxidation catalyst (DOC)) for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

In a further embodiment, a suitable filter substrate is located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is un-catalyzed, the means for metering nitrogenous reductant can be located between the oxidation catalyst and the filter.

Figure 2:
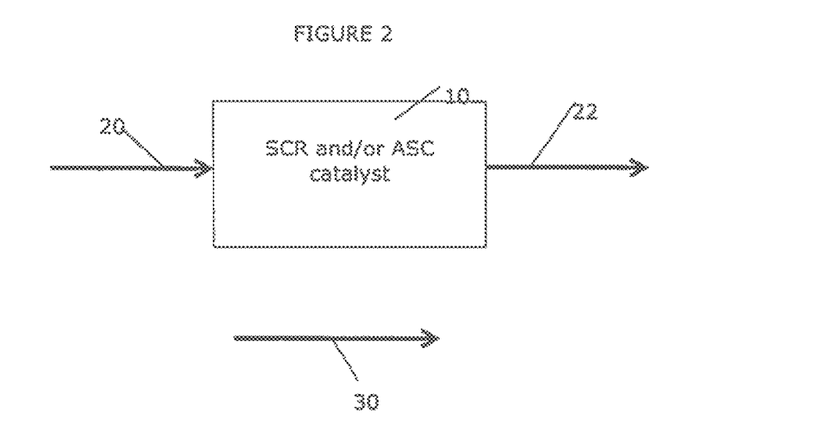
FIG. 2 shows a schematic diagram of an embodiment of the invention.

Turning to FIG. 2, shown is an embodiment of the invention comprising an SCR and/or ASC catalyst 10, an exhaust gas 20, a purified gas 22, and a direction of flow through the SCR and/or ASC catalyst 30. In certain embodiments, the exhaust gas 20 has an inlet concentration of NO and/or $NO_2$ and the purified gas 22 has an outlet concentration of NO and/or $NO_2$ that is less than the inlet concentration. The purified gas 22 also has an outlet concentration of $N_2O$ that is less than the inlet concentration of NO and/or $NO_2$.

EXAMPLES

Example 1

A series of zeolites with two types of framework structures were evaluated at different silica to alumina ratios (SAR), CHA (SAR=26, 17, 13), ERI (SAR=13 and 7). The copper loading on these catalysts were maintain the same at 3 wt. %. Exchanged zeolites were calcined to 500° C. before being coated onto 400 cpsi/4.5 mil ceramic substrates. Core samples (1"×2") were evaluated at a GHSV=50,000 h$^{-1}$ in gas consisting of 350 ppm $NH_3$, 350 ppm NO, 14% $O_2$, 4.6% $H_2O$, 5% CO2 in $N_2$. Inlet and outlet gas compositions were monitored by FTIR to determine the conversion efficiency of NO and the formation of $N_2O$.

Figure 1:
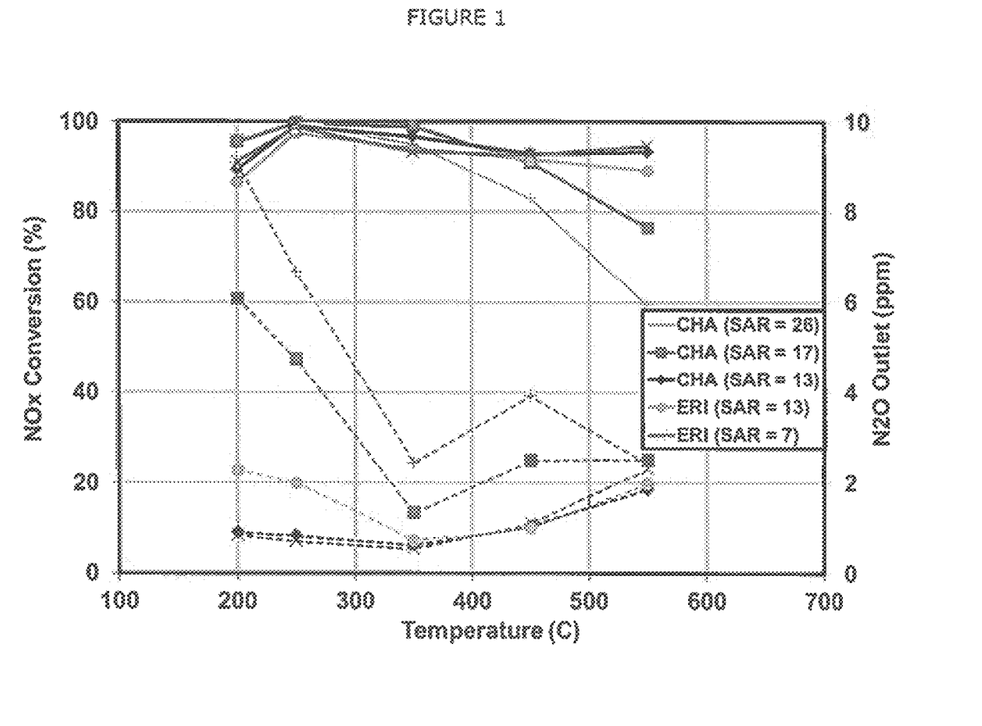
FIG. 1 shows $NO_x$ conversion (solid lines) and $N_2O$ generation (dashed lines) during steady state data evaluation of certain embodiments of the invention and comparative examples at a GHSV of 50,000 $h^{-1}$ and an ammonia to $NO_x$ ratio of 1.

The steady state $NO_x$ conversions as a function of temperature over the catalysts are summarized in FIG. 1 as solid lines. Although all the catalysts show high and comparable $NO_x$ conversion at temperatures below 350° C. regardless of the SAR of the zeolite supports, a clear trend is seen that the $NO_x$ conversion at 550° C. increases with the decrease of the SAR. Additionally, the $N_2O$ formation, plotted in FIG. 1 as dash curves, also show a clear dependence on the SARs of the zeolite supports; the low SAR samples regardless of framework type consistently result in lower $N_2O$ formation.

What is claimed is:

1. A method for reducing $N_2O$ emissions in an exhaust gas comprising contacting an exhaust gas containing $NH_3$ and an inlet NO concentration with an SCR catalyst composition containing small pore zeolite having an SAR of about 3 to about 15 and having about 1 - 5 wt. % of an exchanged transition metal to produce a purified gas containing an outlet NO concentration and an outlet $N_2O$ concentration,
   a. wherein the inlet NO concentration and outlet NO concentration have a relative ratio of > about 4,
   b. wherein the inlet NO concentration and outlet $N_2O$ concentration have a relative ratio of > about 50, and
   c. wherein the small pore zeolite has a framework selected from AD, AFT, and AFX.

2. The method of claim 1, wherein the inlet NO concentration and outlet NO concentration have a relative ratio of > about 5.

3. The method of claim 1, wherein the inlet NO concentration and outlet NO concentration have a relative ratio of > about 10.

4. The method of claim 1, wherein the inlet NO concentration and outlet $N_2O$ concentration have a relative ratio of > about 80.

5. The method of claim 4, wherein the inlet NO concentration and outlet $N_2O$ concentration have a relative ratio of > about 100.

6. The method of claim 1, wherein the transition metal is copper.

7. The method of claim 1, wherein the small pore zeolite has a SAR of about 5 to about 9.

8. The method of claim 1, wherein the small pore zeolite has a SAR of about 10 to about 15.

9. The method of claim 1, wherein the small pore zeolite has a framework selected from AFT and AFX.

10. The method of claim 1, wherein the small pore zeolite has an AEI framework.

11. The method of claim 1, wherein the NO and $NO_2$ are present in a ratio of about 4:1 to about 1:3 by volume.

12. The method of claim 1, wherein the $NH_3$ is present in exhaust gas entering the SCR catalyst at an $NH_3$/NO ratio of about 0.5:1 to about 1:2 and an $NH_3/NO_2$ ratio of about 1:1 to about 6:3.

13. A system for treating an exhaust gas comprising, in series and in fluid communication, a diesel oxidation catalyst, a source of nitrogen-based reductant, and an SCR catalyst, wherein the SCR catalyst comprises a small pore zeolite having a framework selected from AEI, AFX and AFT, having an SAR of about 3 to about 15 and having about 1 - 5 wt. % of an exchanged transition metal, and wherein the SCR catalyst is coated on a honeycomb wall-flow filter or flow-through monolith or is an extruded honeycomb body.

* * * * *

UNITED STATES PATENT AND TRADEMARK OFFICE
CERTIFICATE OF CORRECTION

PATENT NO. : 9,561,469 B2  
APPLICATION NO. : 14/665051  
DATED : February 7, 2017  
INVENTOR(S) : Joseph Michael Fedeyko et al.

Page 1 of 1

It is certified that error appears in the above-identified patent and that said Letters Patent is hereby corrected as shown below:

In the Claims

1. A method for reducing N2O emissions in an exhaust gas comprising contacting an exhaust gas containing NH3 and an inlet NO concentration with an SCR catalyst composition containing small pore zeolite having an SAR of about 3 to about 15 and having about 1 - 5 wt. % of an exchanged transition metal to produce a purified gas containing an outlet NO concentration and an outlet N2O concentration,
a. wherein the inlet NO concentration and outlet NO concentration have a relative ratio of > about 4,
b. wherein the inlet NO concentration and outlet N2O concentration have a relative ratio of > about 50, and
c. wherein the small pore zeolite has a framework selected from AD, AFT, and AFX.

Should read:
1. A method for reducing N2O emissions in an exhaust gas comprising contacting an exhaust gas containing NH3 and an inlet NO concentration with an SCR catalyst composition containing small pore zeolite having an SAR of about 3 to about 15 and having about 1 - 5 wt. % of an exchanged transition metal to produce a purified gas containing an outlet NO concentration and an outlet N2O concentration,
a. wherein the inlet NO concentration and outlet NO concentration have a relative ratio of > about 4,
b. wherein the inlet NO concentration and outlet N2O concentration have a relative ratio of > about 50, and
c. wherein the small pore zeolite has a framework selected from AEI, AFT, and AFX.

Signed and Sealed this  
Twenty-fourth Day of December, 2019

Andrei Iancu  
*Director of the United States Patent and Trademark Office*